United States Patent Office 3,641,180
Patented Feb. 8, 1972

3,641,180
METHOD OF DEHYDROGENATING COMPOUNDS
Robert A. Stowe, Midland, and Irvin J. Martin, Ludington, Mich., assignors to The Dow Chemical Company, Midland, Mich.
No Drawing. Filed Dec. 29, 1969, Ser. No. 888,967
Int. Cl. C07c 5/18, 11/02, 11/12
U.S. Cl. 260—669                                    11 Claims

ABSTRACT OF THE DISCLOSURE

Strontium nickel phosphate catalysts are useful for oxydehydrating monoolefin hydrocarbons of 4 to 8 C atoms to the corresponding dienes and alkyl aromatic hydrocarbons having at least 2 C atoms in at least one alkyl group on the ring and ring halogenated derivatives of such aromatic hydrocarbons to the corresponding vinyl benzene aromatic compound. The reaction can be effected in the presence of steam in vapor phase, with 5–150 volume percent of oxygen, based on the hydrocarbon at a reactor inlet temperature of 400–700° C. The reaction can be run cyclically or continuously.

SUMMARY OF INVENTION

This invention relates to a catalytic process for dehydrogenating monolefinic hydrocarbons having at least 4 C atoms in a chain and a total of 4 to 8 C atoms or alkyl substituted aromatic hydrocarbons or ring halogenated aromatic hydrocarbons in which at least one alkyl group has a minimum of 2 C atoms to form compounds of a greater degree of unsaturation than the starting compound. Monoolefins are dehydrogenated to the corresponding dienes having the same number of C atoms in a chain as the monoolefin. The aromatic compounds are converted to vinyl aromatic derivatives.

The process is effected by passing a vaporized mixture of the said hydrocarbon, steam and an oxygen containing gas through a strontium nickel phosphate catalyst bed at a reactor inlet temperature of 400–700° C. and a space velocity of from about 50 to about 1000 based on the hydrocarbon. The process can be operated cyclically or continuously.

One advantage of the invention is a greater increase of catalyst conversion per degree increase in temperature.

Another advantage is the extremely low carbon laydown on the catalyst surface.

Another advantage is the high conversion and high selectivity attainable with the said catalyst to thereby greatly increase the yield of desired product per pass through the reactor.

A further advantage is the operability over long periods of time without apparent loss of dehydrogenating activity of the catalyst.

The strontium nickel phosphate catalyst can be prepared by any one of the following procedures:

(1) feeding one stream containing a mixture of water soluble nickel and strontium salts and another stream containing an alkaline phosphate, such as ammonium phosphate into a reactor and maintaining the pH at 5.0 to 9.5;

(2) feeding an aqueous solution having the requisite ratios of a strontium compound, a nickel compound and phosphoric acid into a reactor in one stream and aqueous or gaseous ammonia as the second stream, at a rate to maintain the desired pH of the mixture;

(3) or blending a solution or slurry of strontium hydroxide with a solution of a nickel compound in aqueous phosphoric acid and maintaining the above pH range. The precipitate is separated by known means, washed, if desired, and dried. The dried material is then ground to pass through a 12 mesh sieve, blended with a small amount, 1–5%, of a lubricant such as graphite, pelleted and roasted at 450–750° C. in an air or a mixture of steam and air to remove the lubricant. If desired, the granular form of the catalyst can be used without pelleting. Preferably, a minor amount, 0.2 to 10 percent by weight, of chromic oxide is admixed with the catalyst material. If the catalyst is to be formed into pellets, the chromic oxide is added before the pelleting step. Methods for preparing the catalyst are described in detail in U.S. patent application S.N. 715,491, filed on Mar. 25, 1968 in the names of R. A. Stowe, Z. C. Hanger and R. W. Roberts.

The hydrocarbons which can be dehydrogenated by the process of this invention include the aliphatic hydrocarbons having at least 4 C atoms in a straight chain, and a total of 4–8 C atoms in the molecule, such as n-butane to a mixture of n-butenes and butadiene, n-butenes to butadiene, 2-methyl butane to the corresponding 2-methyl butene and isoprene, the 2-methyl butenes to isoprene, 2,3-dimethyl butane to the corresponding 2,3-dimethyl butenes and 2,3-dimethyl butadiene, 2,3-dimethyl butenes to 2,3-dimethyl butadiene, n-pentane to a mixture of pentenes and pentadienes, pentenes to pentadienes, n-hexane to hexenes and hexadienes, hexenes to hexadienes, n-heptane to heptenes and heptadienes, heptenes to heptadienes, n-octane to octenes and octadienes and octenes to octadienes.

Aromatic hydrocarbons having at least one alkyl substituent of at least 2 C atoms on the aromatic group can also be dehydrogenated to the corresponding alkenyl derivative. Representative compounds which can be dehydrogenated to unsaturated derivatives include ethyl benzene to styrene, cumene to α-methyl styrene, diethyl benzene (m and p) to divinyl benzene, ethyl naphthalene to vinyl naphthalene and halo-ethyl benzenes to halo-styrenes.

The reactor inlet temperature at which dehydrogenation of the above hydrocarbons can be effected can range from about 400 to about 700° C. The preferred range is from about 450 to about 650° C.

The steam to hydrocarbon ratio in the feed to the reactor can be as low as 5 to 1 to about 40 to 1 on a volume basis. The preferred volume ratio of steam to hydrocarbon is from about 10 to 1 to about 20 to 1 volumes per volume of the hydrocarbon.

The average reaction pressure can range from about 3 to about 50 p.s.i.a. The preferred range is from about 10 to about 30 p.s.i.a.

The reaction time will be dictated in part by the other conditions employed in the reaction. These conditions include the hydrocarbon undergoing dehydrogenation, the steam to hydrocarbon ratio, the temperature employed and the proportion of oxygen fed into the reactor.

The volume ratio of oxygen to hydrocarbon can run from about 0.05 to about 1.5. Care must be exercised to maintain a non-explosive mixture in the reactor. This can best be effected by the use of stoichiometric quantities of oxygen below or well above, those at which explosion would occur or by diluting the stream with a non-flammable diluent such as steam or nitrogen.

The examples which follow are intended to illustrate, but not to limit the invention. All space velocities are reported at standard temperature and pressure (0° C. to 760 mm. Hg). In the examples conversion is the amount of hydrocarbon reacted, selectivity is that portion of the hydrocarbon converted to the desired product having a greater degree of unsaturation than the hydrocarbon fed into the reactor and yield is obtained by multiplying conversion by selectivity.

EXAMPLE 1

This example illustrates the process when butene is dehydrogenated to butadiene using a cyclic dehydrogenation-catalyst regeneration procedure.

A catalyst bed of 150 mls. of 90–95% β-strontium nickel phosphate and 5–10% of nickel strontium pyrophosphate was placed in a 1-inch tube furnace equipped with heating controls, butene, steam and air inlets, a water condenser and product measuring and analyzing devices.

Inlet temperature to the reactor was held at about 625° C. and the butene feed was maintained at a rate of about 200 volumes per volume of catalyst per hour. The regeneration and process steam was maintained at about 4000 v./v./hr. and regeneration air was maintained at about 400 v./v./hr. The cycle consisted of about 15 minutes on stream with butene-containing feed, a steam purge for two minutes, regeneration with steam and air for 11 minutes, followed by a steam purge for 2 minutes for a total time of 30 minutes per cycle. During these tests the oxygen was fed during the dehydrogenation portion of the cycle at 20 to about 50 volume percent of the butene in the feed stream. In addition, a control run, in which no oxygen was fed, is included to show the difference between the process of this invention, as compared to a similar procedure in which no oxygen is added to the reactor. The data obtained during these tests averaged for 2 cycles in each case, are tabulated below.

TABLE I

| Cycle No. | Vol. percent $O_2$ in feed | Percent C | S | Yield |
|---|---|---|---|---|
| 7–8 | 0 | 26.6 | 96.0 | 25.6 |
| 24–25 | 20 | 36.4 | 91.9 | 33.0 |
| 33–34 | 35.1 | 44.1 | 86.9 | 38.3 |
| 44–45 | 50.3 | 50.9 | 83.4 | 42.5 |

NOTE.—C = conversion; S = selectivity.

The butadiene in the effluent stream was calculated from data obtained in a vapor phase chromatogram.

EXAMPLE 2

In this series of runs both the reactor inlet temperature and the oxygen concentration supplied as air, were varied. The n-butene feed was held at about 200 v./v./hr. The equipment and procedures used were the same as described in Example 1. The catalyst was a β-strontium nickel phosphate made by blending a solution of .067 mole/liter of Sr(OH) with a solution of .054 mole Ni(NO$_3$)$_2$, .2466 mole H$_3$PO$_4$ and .090 mole NH$_3$ per liter at a pH of about 8.8–8.9. Tabulated below are the data obtained during the runs averaged for several cycles in each test.

TABLE II

| Inlet temp., °C. | Volume percent oxygen | Percent C | S | Y | C deposit, gms./100 gm. catalyst |
|---|---|---|---|---|---|
| 600 | 0 | 28.4 | 97.0 | 27.4 | .0075 |
|  | 6.6 | 34.2 | 95.1 | 32.6 | .0081 |
|  | 13.3 | 38.8 | 93.3 | 36.2 | .0085 |
|  | 20.7 | 43.8 | 90.6 | 39.6 | .0131 |
|  | 25.8 | 49.8 | 89.2 | 44.4 | .0159 |
|  | 30.0 | 52.8 | 87.4 | 46.1 | .0263 |
|  | 34.8 | 55.3 | 86.7 | 48.0 | .0331 |
|  | 40.1 | 57.4 | 84.6 | 48.5 | .0350 |
|  | 45.0 | 58.5 | 82.5 | 48.2 | .0353 |
|  | 49.4 | 60.0 | 80.2 | 48.1 | .0519 |
| 625 | 0 | 39.0 | 95.4 | 37.2 | .0207 |
|  | 6.4 | 42.5 | 94.5 | 40.2 | .0165 |
|  | 12.6 | 46.6 | 93.3 | 43.5 | .0149 |
|  | 21.0 | 51.5 | 90.0 | 46.4 | .0196 |
|  | 25.3 | 56.4 | 89.9 | 50.6 | .0316 |
|  | 35.0 | 60.2 | 85.8 | 51.7 | .0447 |
|  | 44.4 | 65.3 | 83.8 | 54.7 | .0566 |
|  | 55.1 | 69.6 | 79.8 | 55.5 | .0756 |
|  | 65.1 | 71.3 | 78.4 | 55.9 | .0710 |
|  | 75.4 | 74.7 | 75.8 | 56.6 | .0553 |
|  | 84.1 | 75.5 | 71.1 | 53.7 | .0507 |
| 650 | 0 | 49.7 | 94.4 | 46.9 | .0314 |
|  | 20.2 | 59.6 | 90.6 | 53.9 | .0217 |
|  | 35.6 | 67.4 | 85.7 | 57.7 | .0497 |
|  | 51.9 | 72.5 | 81.3 | 59.0 | .0570 |

Carbon was determined by absorption of CO$_2$ in Ascarite during the regeneration cycle in this and other examples.

EXAMPLE 3

The equipment and procedural steps described in Example 1 were employed for this series of runs. The n-butene feed was adjusted to about 150 v./v./hr. in all cases. The steam to butene ratio was held at about 20 to 1 in all tests. The catalyst was that which was used for the tests in Example 2. Oxygen was supplied as air. Tabulated below are the average data obtained during several cycles in each reported run.

TABLE III

| Inlet temp., °C. | Volume percent oxygen | Percent C | S | Y | C deposit, gms./100 gm. catalyst |
|---|---|---|---|---|---|
| 575 | 0 | 27.9 | 95.9 | 26.8 | .0075 |
|  | 6.8 | 32.4 | 93.6 | 30.3 | .0089 |
|  | 13.7 | 37.1 | 90.7 | 33.6 | .0102 |
| 600 | 0 | 38.0 | 95.0 | 36.1 | .0144 |
|  | 10.1 | 42.7 | 92.2 | 39.4 | .1201 |
|  | 20.8 | 49.2 | 89.2 | 43.9 | .1650 |
| 625 | 0 | 48.1 | 94.1 | 45.3 | .0340 |
|  | 9.7 | 52.6 | 91.7 | 48.2 | .0295 |
|  | 20.5 | 58.1 | 88.6 | 51.5 | .0279 |
| 650 | 0 | 55.4 | 90.9 | 50.3 | .0561 |
|  | 20.1 | 64.2 | 87.0 | 55.9 | .0312 |
|  | 49.6 | 75.9 | 79.8 | 60.6 | .0500 |
| 670 | 0 | 64.5 | 87.8 | 56.8 | .0460 |
|  | 19.5 | 71.0 | 84.3 | 59.9 | .0324 |
|  | 49.6 | 80.8 | 76.1 | 61.5 | .0675 |

EXAMPLE 4

The apparatus and procedural steps for this series of runs was the same as disclosed in Example 1. In all instances the steam to butene ratio was 20 to 1 and the butene was fed to the reactor at about 200 v./v./hr. During the tests, the temperature and volume percent oxygen were varied. Oxygen supplied as air during part of the tests and as commercially pure O$_2$ during another portion of the tests. The catalyst was the same as that described in Example 2. The data obtained are tabulated below:

TABLE IV

| Inlet temp., °C. | Volume percent oxygen | Percent C | S | Yield |
|---|---|---|---|---|
| Air: |  |  |  |  |
| 600 | 0 | 35.3 | 96.0 | 33.9 |
|  | 20.2 | 45.5 | 91.2 | 41.5 |
|  | 35.5 | 54.2 | 86.5 | 46.8 |
|  | 50.4 | 61.3 | 84.8 | 51.5 |
| 625 | 0 | 45.7 | 95.2 | 43.5 |
|  | 19.9 | 55.8 | 88.9 | 50.2 |
|  | 35.0 | 62.7 | 86.1 | 54.0 |
|  | 49.9 | 69.2 | 82.8 | 57.8 |
| 650 | 0 | 56.8 | 93.1 | 52.8 |
|  | 20.0 | 64.4 | 89.0 | 57.3 |
|  | 34.7 | 71.2 | 84.7 | 60.3 |
|  | 50.1 | 76.1 | 80.9 | 61.6 |
| O$_2$ only: 625 | 20.3 | 54.5 | 90.1 | 49.1 |
|  | 35.0 | 62.1 | 85.3 | 52.9 |
|  | 50.1 | 68.2 | 81.2 | 55.4 |

EXAMPLE 5

The example shows the results obtainable by the practice of this invention in a continuous system of operation instead of the cyclic procedure described above. The continuous process differs from the cyclical procedure in that butene, steam and oxygen were fed into the reactor for long periods of time without any intervening catalyst regenerating steps. The reactor was the same as that described heretofore. The catalyst was that used for the runs of Example 4. At an inlet reactor temperature of 625° C., a butene to steam ratio of 20 to 1 and an oxygen content of 50% by volume of the butene in an 18 hour run the conversion ranged between 51.9 and 54.7%, the selectivity ranged between 72.5 and 74.4% and yield ranged from 37.9 to 39.8%. After the 18 hour run, the steam to butene ratio was increased to 40 to 1. The remaining feed ratios and reaction conditions described above were maintained and the run was continued for an additional 18 hours. The conversion ranged from 45.6 to 56.2%, selectivity from 83.2 to 86.5% and yield from 38.7 to 47.4%.

At the end of the 36 hours, the reaction was stopped for a week-end shut down. Then the reaction was started using the 40 to 1 steam ratio, 200 v./v./hr. butene and 50% oxygen, based on butene, and an inlet reactor temperature of 625° C. This continuous run was operated for four days without stopping. After 24 hours the feed was reduced to 100 v./v./hr. 22 hours and then increased to 200 v./v./hr. without altering the ratio of ingredients. The final sample showed a 55.1% conversion, a selectivity of 84.7% and a yield of 46.7%. The range of conversion over the four day period was 48–68%, the selectivity was 82.4–86.6% and yield was 38.7 to 57.9%.

EXAMPLE 6

The runs of this example were cyclic, with 2-methyl-2-butene in the feed undergoing dehydrogenation. The hydrocarbon analyzed 96.2 wt. percent 2-methyl-2-butene, 1.5% transpentene-2 and 2.3% cis-pentene-2-. The cycle times described in Example 1 were used. The feed rate was 200 v./v./hr. 2-methyl-2-butene, and a steam-hydrocarbon ratio of 20 to 1. The catalyst was the same as that described in Example 4. The data tabulated below were obtained in these tests.

TABLE V

| Inlet temp., ° C. | Mole O₂/mole isopentene | Gms. feed input for 2 cycles | Condensed product Gms. | Wt. percent isoprene |
|---|---|---|---|---|
| 575 | 0 | 48.6 | 45.9 | 30.0 |
|  | .193 | 48.6 | 45.4 | 35.6 |
|  | .339 | 48.6 | 41.0 | 38.0 |
| 600 | 0 | 48.6 | 44.5 | 39.6 |
|  | .198 | 48.6 | 43.4 | 44.9 |
|  | .338 | 48.6 | 43.0 | 46.2 |

The effluent from this reaction was passed through a condenser with ice and then through Dry Ice traps. Liquid condensate from each of the cooling units was collected and the isoprene was determined from samples of the total condensates by vapor phase chromatographic procedures.

EXAMPLE 7

In a cyclic process n-butane was substituted for n-butene in the feed, oxygen was supplied as air. Set out below are data from the runs of this test.

TABLE VI

| Inlet temp., ° C. | n-Butane, v./v./hr. | Volume percent oxygen | Percent C | S | Y | Ratio, butadiene/butenes |
|---|---|---|---|---|---|---|
| 600 | 199 | 0 | 3.0 | 89.5 | 2.6 | 0.95 |
|  | 201 | 9.7 | 5.3 | 77.0 | 4.1 | 1.36 |
|  | 201 | 20.2 | 6.7 | 70.4 | 4.7 | 1.45 |
| 625 | 200 | 0 | 2.9 | 72.7 | 2.1 | 0.17 |
|  | 201 | 11.4 | 7.6 | 70.0 | 5.3 | 1.78 |
|  | 200 | 19.8 | 9.7 | 64.5 | 6.2 | 2.17 |
| 650 | 200 | 0 | 7.1 | 60.2 | 4.3 | 2.34 |
|  | 199 | 19.7 | 15.6 | 58.2 | 9.1 | 2.84 |
|  | 102 | 0 | 7.8 | 65.4 | 5.1 | 2.20 |
|  | 103 | 19.7 | 11.7 | 61.2 | 7.2 | 3.74 |
|  | 101 | 40.8 | 17.6 | 59.5 | 10.4 | 2.16 |

EXAMPLE 8

In this example ethylbenzene was oxydehydrogenated to styrene. The catalyst was the same as that used in Example 2. The reactor was a ¾ by 36 inch type 446 stainless steel, packed with 70 ml. of the catalyst. Ethyl benzene was fed to the reactor at a rate of about 48.66 grams per hour and water, in the form of steam, was fed at a rate of about 74.15 grams per hour. Air, the source of oxygen, was fed at varying rates per hour. The test was run continuously at a temperature of about 650° C. for a period of about 82 hours. The reactor effluent was condensed and collected in a separatory funnel device. Periodically, the sample was separated into organic and aqueous layers and the organic layer was assayed for its styrene content by bromination.

A portion of the data taken during the test is tabulated below:

TABLE VII

| Hours on reaction | Cut No. | Air rate, ft.³/hr.(STP) | Weight percent styrene in recovered organic product |
|---|---|---|---|
| 1 | 1 | 0.63 | 30.4 |
| 2 | 2 | 0.84 | 29.4 |
| 10 | 5 | 0.85 | 28.8 |
| 22 | 8 | 0.84 | 27.2 |
| 30 | 10 | 0.88 | 28.0 |
| 42 | 13 | 0.82 | 27.2 |
| 50 | 15 | 0.85 | 27.4 |
| 60 | 19 | 0.85 | 27.8 |
| 82 | 25 | 0.82 | 27.4 |

During the last 28 hours of the run, the cuts from 16–25 were blended together and analyzed by gas phase chromatography. The calculated results showed 29.59 mole percent conversion of ethylbenzene with a selectivity to styrene of 94.25%.

When the procedure was repeated without air addition using the same steam and ethylbenzene feed rates as described in this example, the conversion declined rapidly as shown by the data collected during the 67 hour run, tabulated below.

| Hours on reaction | Cut No. | Weight percent sytrene in recovered organic product |
|---|---|---|
| 1 | 1 | 28.8 |
| 2 | 2 | 22.4 |
| 4 | 3 | 18.2 |
| 6 | 4 | 14.2 |
| 8 | 5 | 12.8 |
| 18 | 10 | 14.0 |
| 31 | 14 | 12.0 |
| 43 | 17 | 10.4 |
| 55 | 20 | 10.0 |
| 67 | 23 | 9.4 |

During the run the cuts from 4–23 representing the final 63 hours were blended for analysis. The calculated results showed 13.69 mole percent conversion of ethylbenzene with a selectivity of 88.39%.

We claim:

1. A method of dehydrogenating aliphatic hydrocarbons having from 4 to 8 C atoms and at least 4 C atoms in a chain and aromatic hydrocarbons of from 8 to 10 C atoms having at least one alkyl group of at least 2 C atoms, and ring halogenated derivatives of said aromatic hydrocarbons comprising contacting with a strontium nickel phosphate catalyst at least one of said hydrocarbons in admixture with steam and from about 5 to about 150 volume percent, based on the hydrocarbon of uncombined oxygen at an inlet temperature of from about 400 to about 700° C.

2. The method of claim 1 in which the oxygen is supplied as air.

3. The method of claim 1 in which substantially undiluted oxygen is admixed with the feed stream.

4. The method of claim 1 in which the inlet temperature ranges from 450–650° C.

5. The method of claim 1 in which the process is continuous.

6. The method of claim 1 in which the hydrocarbon is n-butene.

7. The method of claim 1 in which the hydrocarbon is isopentene.

8. The method of claim 1 in which the hydrocarbon is ethyl benzene.

9. The method of claim 5 in which the hydrocarbon is n-butene.

10. The method of claim 5 in which the hydrocarbon is isopentene.

11. The method of claim 1 in which the oxygen is introduced at intervals along the catalyst bed.

References Cited

UNITED STATES PATENTS 3,396,205    8/1968    Alexander et al. ----- 260—680
3,409,700    11/1968    Noddings et al. ---- 260—683.3

CURTIS R. DAVIS, Primary Examiner

U.S. Cl. X.R.

260—650, 680 E, 683.3